(12) United States Patent
Lockemann et al.

(10) Patent No.: US 6,375,873 B1
(45) Date of Patent: Apr. 23, 2002

(54) PROCESS AND APPARATUS FOR PRODUCING STABLY FINE-PARTICLE POWDERS

(75) Inventors: Christian Lockemann, Mannheim; Erik Lüddecke, Mutterstadt; Dieter Horn, Heidelberg, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/459,723

(22) Filed: Dec. 13, 1999

(30) Foreign Application Priority Data

Dec. 28, 1998 (DE) .......................... 198 60 497

(51) Int. Cl.$^7$ ................................ B29B 9/10
(52) U.S. Cl. .................. 264/7; 264/5; 264/13; 425/6
(58) Field of Search .................. 264/7, 5, 13; 425/6

(56) References Cited

U.S. PATENT DOCUMENTS

| | | | |
|---|---|---|---|
| 5,043,280 A | | 8/1991 | Fischer et al. ............. 435/235 |
| 5,736,074 A | * | 4/1998 | Hayes et al. ................. 264/6 |
| 5,833,891 A | * | 11/1998 | Subramaniam et al. ......... 264/7 |
| 6,087,003 A | * | 7/2000 | Benoit et al. ............... 428/403 |

FOREIGN PATENT DOCUMENTS

| | | |
|---|---|---|
| AU | 705121 | 6/1996 |
| CA | 2182786 | 8/1995 |
| DE | 3744329 | 7/1989 |
| DE | 4445341 | 6/1996 |
| EP | 744992 | 12/1996 |

OTHER PUBLICATIONS

C. J Chang and A.D. Randolph: "Precipitation of Microsize Organic Particles from Supercritical Fluids" AICh.E.J. (1989) vol. 35, Nr. 11, 1876–1882.

\* cited by examiner

*Primary Examiner*—Mary Lynn Theisen
(74) *Attorney, Agent, or Firm*—Keil & Weinkauf

(57) ABSTRACT

The invention relates to a process and an apparatus for producing stably fine-particle powders. The invention starts from a process for producing stably fine-particle powders in which one or more substances A and one or more substances B are dissolved in supercritical fluids, and the solutions are decompressed along a holdup section. In the process, substances A and B are each dissolved in separate supercritical compressible fluids, and the holdup sections interpenetrate, with the solubility limit of A in the appropriate fluid being exceeded at an earlier time than is the solubility limit of B in the appropriate fluid.

11 Claims, 3 Drawing Sheets

PROCESS AND APPARATUS FOR PRODUCING STABLY FINE-PARTICLE POWDERS

Figure 1:
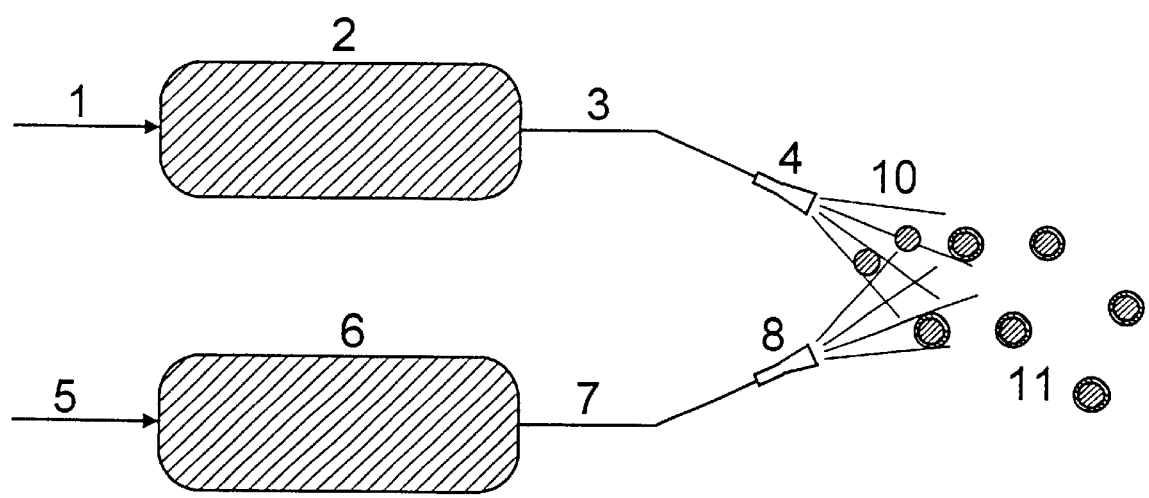

The invention relates to a process and an apparatus for producing stably fine-particle powders.

The products resulting from industrial chemical processes generally do not have the desired particle size and particle size distribution. In the case of pharmaceutical products, products for human and animal nutrition and substances acting on plants, the coarsely crystalline structure of the products results in poor bioavailability. Conventional processes for changing particle sizes and particle size distributions are grinding, spray drying, desublimation and crystallization from solutions. With the mechanical processes there is sometimes considerable heating of the treated substances, which may lead in the case of thermally labile substances or substance mixtures to the constituents being destroyed or damaged. The thermal processes such as, for example, sublimation or freeze drying can be applied only to a few substances. The solvents used in crystallization processes can be removed from the solids only with difficulty and frequently result as waste material. Active substances can in some cases be reduced to particle sizes in the submicron range by conventional processes. However, the particles which are initially formed agglomerate again to give larger structures, or sinter or undergo Ostwald ripening (change in the particle size distribution toward a standard size).

One possibility for producing stable microfine particles with a size of distinctly less than one micrometer consists of precipitation in aqueous phase, with a stabilizer (for example a protective colloid) being dissolved in this phase. This stabilizer envelopes the particles which have just been formed and thus protects them from agglomeration and other growth mechanisms. The precipitation can take place from a conventional solvent or else be carried out with the aid of supercritical fluids (DE-A 44 45 341). The described processes have the disadvantage that they result in dispersions which have to be dried at great expense in order to obtain a dry powder as final product. The publication by C. J. Chang and A. D. Randolph: Precipitation of Microsize Organic Particles from Supercritical Fluids, AICh.E J. (1989) Volume 35, No. 11, pages 1876–1882, describes the production of microfine particles with the aid of supercritical fluids. Besides precipitation in an aqueous phase using gelatin as protective colloid there is also a description of decompression of a supercritical fluid loaded with active substance to atmospheric pressure in the absence of a liquid. A stabilizer was dispensed with in this instance. The average particle size was about one micrometer in this case.

A process for producing active substance/carrier combinations in the form of a dry powder with the aid of supercritical fluids is described in DE-A 37 44 329 and U.S. Pat. No. 5,043,280. In this process, the active substance is dissolved or suspended together with a carrier in an organic solvent, the solution or suspension is sprayed into a supercritical fluid phase, and this new phase is decompressed. This results in carrier particles in which the active substance is embedded, and solvent droplets which are separated by gas. A disadvantage of this process is the residual solvent content of the particles, which favors recrystallization and, associated therewith, growth (Ostwald ripening, see above) of the active substance particles. In addition, it is possible with this process to produce only average particle sizes down to several micrometers.

EP-B 0 744 992 describes a process in which the active substance, which may also be introduced in the form of a mixture, is saturated with a gas under high pressure to form a liquid solution. In the subsequent decompression, the gas escapes from the active substance or the substance mixture. The cooling achieved thereby leads to solidification of the active substance, which can then be deposited as powder. The particular disadvantage of this process is the average particle size, which is greater than 8 $\mu$m.

It is an object of the present invention to provide a process for producing powders which are so stable that essentially no agglomeration, no sintering and no diffusion and crystallization processes from one particle to another are possible, and which have an average particle size in the submicron range.

A further object of the invention is to provide an apparatus for carrying out the process according to the invention.

The invention starts from a process for producing stably fine-particle powders in which one or more substances A and one or more substances B are dissolved in supercritical fluids, and the solutions are decompressed along holdup sections.

In the process, substances A and B are each dissolved in separate supercritical compressible fluids, and the holdup sections interpenetrate, with the solubility limit of A in the appropriate fluid being exceeded at an earlier time than is the solubility limit of B in the appropriate fluid.

The term "solubility limit" designates the maximum solubility prevailing under the particular conditions.

The substances A are preferably active substances, and the substances B are ancillary substances.

"Supercritical fluids" refer for the purpose of the present invention to fluids for which at least the pressure or temperature is close to their critical pressure or critical temperature respectively. The pressure and/or temperature must be so close to the respective critical values that the dissolving properties of the respective fluids for substance(s) A and B are comparable with the properties existing when both the pressure and the temperature of the fluids are above the respective critical values. Thus, for the purpose of the invention, the term "supercritical fluid" also embraces fluids whose pressure and/or temperature is below the respective critical value. However, it is preferred for the pressure or temperature, in particular pressure and temperature, to be above the respective critical value.

In one embodiment of the process, substance B or at least one of substances B is a stabilizer.

The process is based on the recognition that it is unnecessary, nor is it expedient, for generating stable dry active substance particles to dissolve active substance and stabilizer together in a supercritical fluid and that separately dissolving in separate supercritical fluid streams and separate decompression of these solutions with a mutual intersection of the holdup sections is technically feasible and has crucial advantages. The parameters for this process must be chosen so that the solubility limit of the active substance in fluid elements present in the holdup section is exceeded faster than the solubility limit of stabilizers present in adjacent fluid elements, so that active substance particles with an average size in the submicron range are produced and act as crystallization nuclei for the stabilizer substance, so that the active substance particles are enveloped by stabilizer substance.

It is possible by appropriate choice of the following parameters to influence the time at which A or B separates out in a fluid element present in the holdup section:
1. Choice of B.
2. Choice of the fluids in which A and B are dissolved.
3. Choice of the pressures to which the fluids containing A and B are subject.

4. Choice of the pressure prevailing along the holdup section.
5. Choice of the temperature of the fluids containing A and containing B.
6. Choice of the length of the holdup sections which must be covered by the fluid elements containing A and B until they reach the point of intersection of the holdup sections.

The stabilizer substance can be chosen so that stable fine-particle powders are produced, the particles of which neither agglomerate nor sinter nor undergo diffusion and crystallization processes from one particle to the other.

The fluid, pressure and temperature can be chosen to be identical or different for substances A and B, independently of one another. The same applies to the choice of the length of the holdup sections. The pressure prevailing along the holdup sections can also be chosen without restriction.

In a further embodiment of the process, the holdup sections are spray cones.

In another embodiment of the process, substance(s) A and/or B is dissolved in the particular fluid using pressure vessels.

In another embodiment of the process, the decompression is effected by decompression apparatuses which may be, independently of one another, nozzles, in particular single-substance nozzles or coaxial two-substance nozzles, valves, diffusors, capillaries or apertures.

In another embodiment of the process, a fluid is returned after the decompression to the dissolving zone and reused as compressed fluid to dissolve one or more substances A or one or more substances B.

In another embodiment of the process, the particle stream is removed by suitable separating apparatuses, for example cyclones, fabric filters, scrubbers or electrofilters.

In another embodiment of the process, at least one substance B is a polymer, a lipid, a carbohydrate or a peptide. Block copolymers and fluorinated polymers are particularly preferred as polymer. The fluorinated polymers are preferably branched polymers or block copolymers having fluorinated end groups, for example of the type —$(CF_2)_6$—$CF_3$. These end groups have a relatively high affinity for $CO_2$. This results in a polymer which is able to interact with nonpolar substances, has a relatively large solubility for $CO_2$ and is, in some circumstances, dispersible in water.

In another embodiment of the process, at least one substance A is a dye, vitamin, carotenoid, liposome, pharmaceutical active substance, substance acting on plants, fragrance or flavoring.

In another embodiment of the process, $C_1$–$C_6$-hydrocarbons, $C_1$–$C_4$-alcohols, sulfur hexafluoride, nitrogen, noble gases, gaseous oxides, acetone, halogenated hydrocarbons, ammonia or water or a mixture of such substances is employed as fluid. Preferred as $C_1$–$C_6$-hydrocarbon are methane, ethane, ethylene, propane, propene, n-butane, i-butane, n-pentane, i-pentane, n-hexane or i-hexane. Preferred as $C_1$–$C_4$-alcohol are methanol, ethanol, isopropanol, n-propanol or butanols. Gaseous oxides are preferably carbon dioxide, dinitrogen monoxide or sulfur dioxide.

The invention further relates to an apparatus which has a high-pressure autoclave 2 for dissolving the substance(s) A in a supercritical fluid and a second high-pressure autoclave 6 for dissolving the substance(s) B in a supercritical fluid, and which has two separate feed lines 3 and 7 with which the fluids loaded with A and B respectively are connected to decompression apparatuses 4 and 8 respectively, which decompress the two fluids separately and are arranged so that the material streams escaping from them mutually intersect at least in part.

The invention is described below by means of FIGS. 1 to 3, which show

Figure 2:
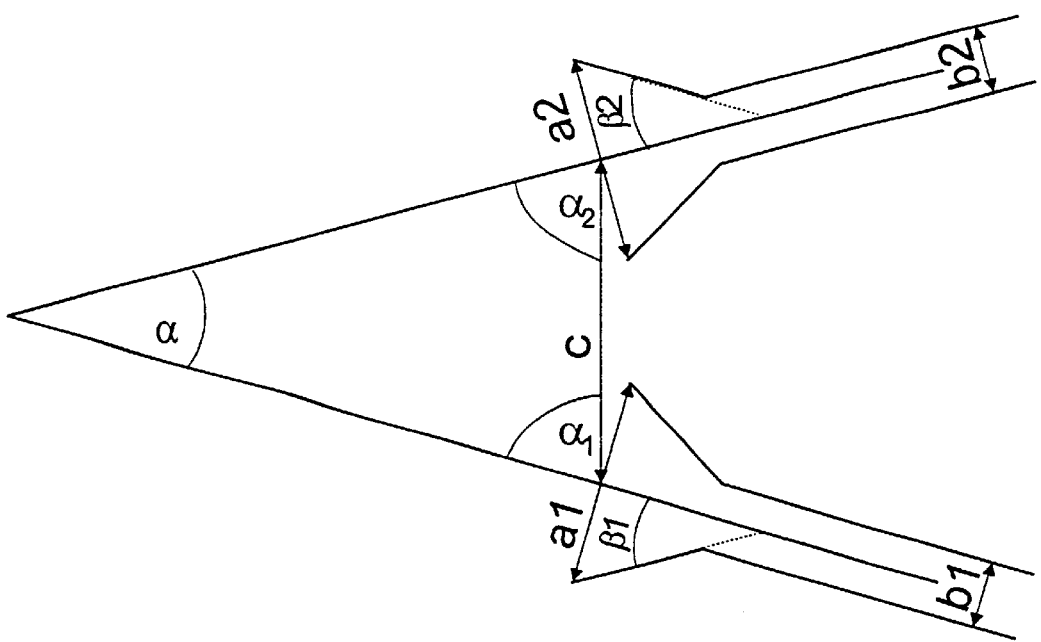

FIG. 1 the design of the apparatus according to the invention,

FIG. 2 the arrangement of two nozzles and

Figure 3:
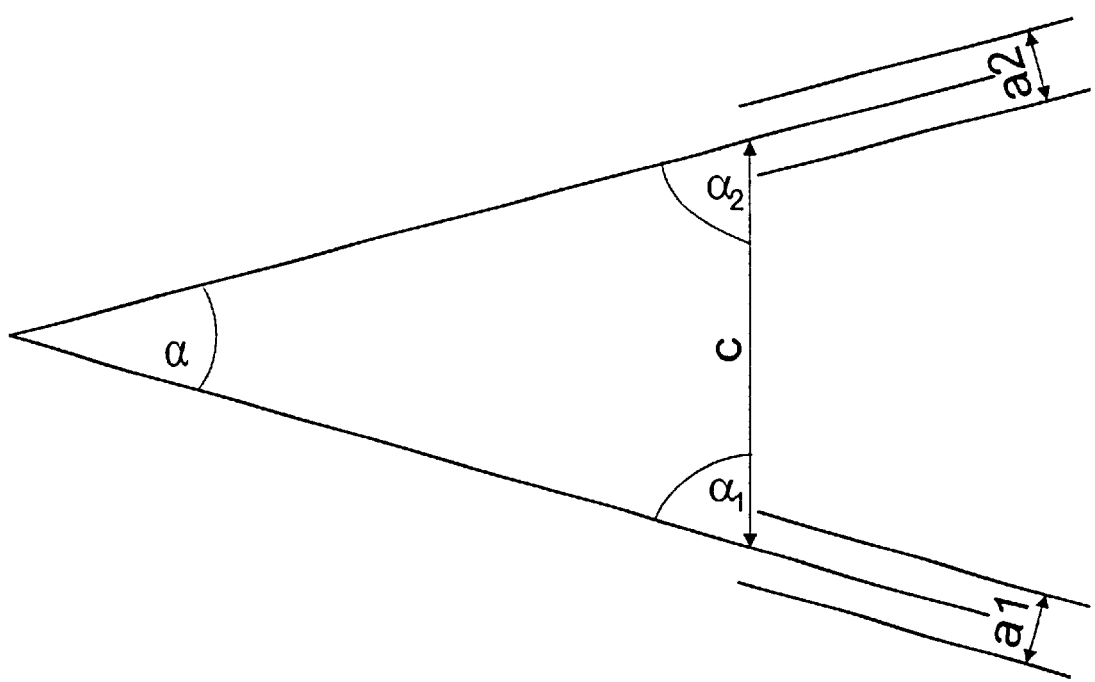

FIG. 3 the arrangement of two single nozzles.

In FIG. 1, a fluid flows through a feed line 1 into a high-pressure autoclave 2 in which a substance A is present, and takes up substance A. Another fluid flows through feed line 5 into the high-pressure autoclave 6 in which substance (s) B are present, and takes up substance(s) B. The fluids present in the high-pressure autoclaves 2 and 6 may be one and the same substance or different substances. It is likewise possible for the two fluids to have the same pressure and the same temperature, or to differ in both parameters; however, they should be supercritical as defined above. The feed lines 3 and 7 connect the high-pressure autoclaves 2 and 6 to the corresponding decompression apparatuses 4 and 8 so that mixing of the two fluids before the decompression is prevented. The decompression apparatuses are designed as high-pressure nozzles. The decompression apparatuses 4 and 8 are arranged so that they produce spray cones which interpenetrate.

Through suitable choice of the operating parameters of the apparatus there is initial formation of particles 10 consisting of the substance A. An envelope consisting of the substance B forms around these particles. The resulting particle stream 11 can be removed by suitable means, for example by a cyclone, a fabric filter, a membrane filter, a scrubber or an electrofilter.

FIG. 2 describes the geometric arrangement of two nozzles. In this case, a designates the orifice diameter of the nozzle and b designates the diameter of the feed line immediately upstream of the nozzle. The angle α designates the angle formed by the axes of the nozzles with one another. The angle $α_1$ designates the angle between the axis of the first nozzle and the connecting line between the center of the orifice of nozzle 1 and 2. The angle β designates the orifice angle of the nozzles. The distance between the center of the two nozzle orifices is labeled c. All geometric data relating to the first nozzle are given the index 1, and those relating to the second nozzle are given the index 2.

FIG. 3 describes the geometric arrangement of two single nozzles for which the special case a=b applies. The meanings of the reference numerals are analogous to those in FIG. 2.

EXAMPLE 1

About 5 g of β-carotene were introduced into an autoclave with a capacity of 250 ml which was maintained at 50° C. A $CO_2$ stream (0.8 kg/h) was compressed to 250 bar and preheated to 50° C. and passed into the autoclave. The supercritical $CO_2$ stream loaded with carotene was then passed to a first nozzle. 10 g of a block copolymer based on maleic anhydride and a mixture of $C_{20}$–$C_{24}$-olefins were introduced into a second autoclave with a capacity of 250 ml maintained at a constant temperature. A $CO_2$ stream (0.8 kg/h) was also passed through this autoclave under 250 bar and at 50° C. and then passed to a second nozzle. Both nozzles were single nozzles with a diameter $a_1$ and $a_2$ each of 50 μm. They were arranged at a distance c of 20 mm in the form of an isosceles triangle ($α_1=α_2$). The angle α formed by the axes of the two nozzles was 30°. Accordingly, the spray cones of the two nozzles overlapped.

On decompression of the two fluid streams, a fine-particle powder with an average particle diameter of 400 nm was deposited. Transmission electron micrographs show that singulation of the active ingredient particles had taken place: the active substance β-carotene was in the form of a spherical core around which the polymer formed a uniform envelope.

EXAMPLE 2

The test conditions of Example 1 were retained but 10 g of methyl palmitate were introduced instead of the block copolymer into the second autoclave. Transmission electron micrographs show that once again singulation of the active substance cores had taken place: β-carotene was in the form of a core enveloped by methyl palmitate. The particles had an average diameter of about 300 nm but, in contrast to those described in Example 1, they showed a tendency to agglomerate, although weakly.

EXAMPLE 3

The test conditions of Example 1 were chosen once again. However, the fluid stream employed with the intention of taking up the active substance (β-carotene) was $N_2O$ at 100 bar and 50° C. (0.8 kg/h). This fluid stream was passed into the first autoclave in which β-carotene was present. $CO_2$ (0.8 kg/h) was passed through the second autoclave with the block copolymer present therein under 50 bar and at 50° C. After decompression, a fine-particle powder was formed in the overlapping spray cones and had an average particle diameter of 500 nm. Transmission electron micrographs once again showed singulation of the particles with a core of β-carotene and a uniform polymer envelope.

We claim:

1. A process for producing stably fine-particle powders in which one or more substances A and one or more substances B are dissolved in supercritical fluids, and the solutions are decompressed along holdup sections, wherein substance(s) A and substance(s) B are each dissolved in separate supercritical compressible fluids;

the holdup sections interpenetrate, with the solubility limit of A in the appropriate fluid being exceeded at an earlier time than the solubility limit of B in the appropriate fluid.

2. A process as claimed in claim 1, wherein at least one substance B is a stabilizer.

3. A process as claimed in claim 1, wherein the holdup sections are spray cones.

4. A process as claimed in claim 1, wherein the dissolving of substance A and/or substance B in the particular fluid takes place using pressure vessels.

5. A process as claimed in claim 1, wherein the decompression is effected by decompression apparatuses.

6. A process as claimed in claim 1, wherein a fluid is returned after decompression to the dissolving zone and reused as compressed fluid for dissolving substance A and/or substance B.

7. A process as claimed in claim 1, wherein the particle stream is removed by suitable separating apparatuses, for example cyclones, fabric filters, scrubbers or electrofilters.

8. A process as claimed in claim 1, wherein at least one substance B is a polymer, lipid, carbohydrate or peptide.

9. A process as claimed in claim 1, wherein at least one substance A is a dye, vitamin, carotenoid, liposome, pharmaceutical active substance, substance acting on plants, fragrance or flavoring.

10. A process as claimed in claim 1, wherein at least one fluid is $C_1$–$C_6$-hydrocarbons, $C_1$–$C_4$-alcohols, sulfur hexafluoride, nitrogen, noble gases, gaseous oxides, acetone, halogenated hydrocarbons, ammonia or water or mixtures of these substances mentioned.

11. An apparatus for carrying out a process as claimed in claim 1, which has a high-pressure autoclave (2) for dissolving the substance(s) A in a supercritical fluid and a second high-pressure autoclave (6) for dissolving the substance(s) B in a supercritical fluid, and which has two separate feed lines (3) and (7) with which the fluids loaded with A and B respectively are connected to decompression apparatuses (4) and (8) respectively, which decompress the two fluids separately and are arranged so that the material streams escaping from them mutually intersect at least in part.

* * * * *